A. WALLACE.

FOOTPLATE FOR ELECTRIC LOCOMOTIVES.

APPLICATION FILED JAN. 31, 1921.

Reissued July 5, 1921.

15,145.

4 SHEETS—SHEET 1.

Inventor-
Allen Wallace
By his Attorneys
Howson & Howson

A. WALLACE.
FOOTPLATE FOR ELECTRIC LOCOMOTIVES.
APPLICATION FILED JAN. 31, 1921.
Reissued July 5, 1921. 15,145.
4 SHEETS—SHEET 2.
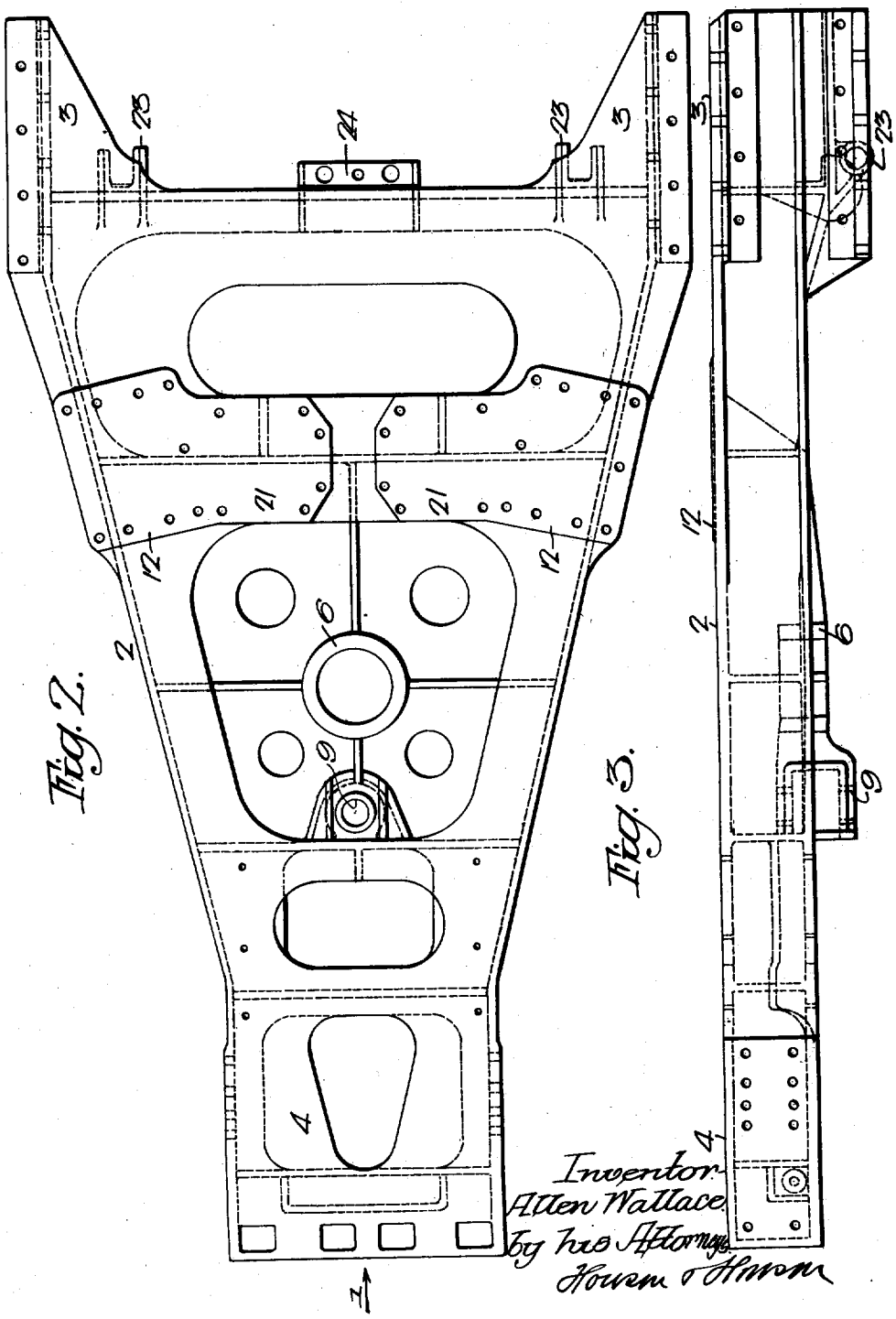

A. WALLACE.
FOOTPLATE FOR ELECTRIC LOCOMOTIVES.
APPLICATION FILED JAN. 31, 1921.
Reissued July 5, 1921. 15,145.
4 SHEETS—SHEET 3.
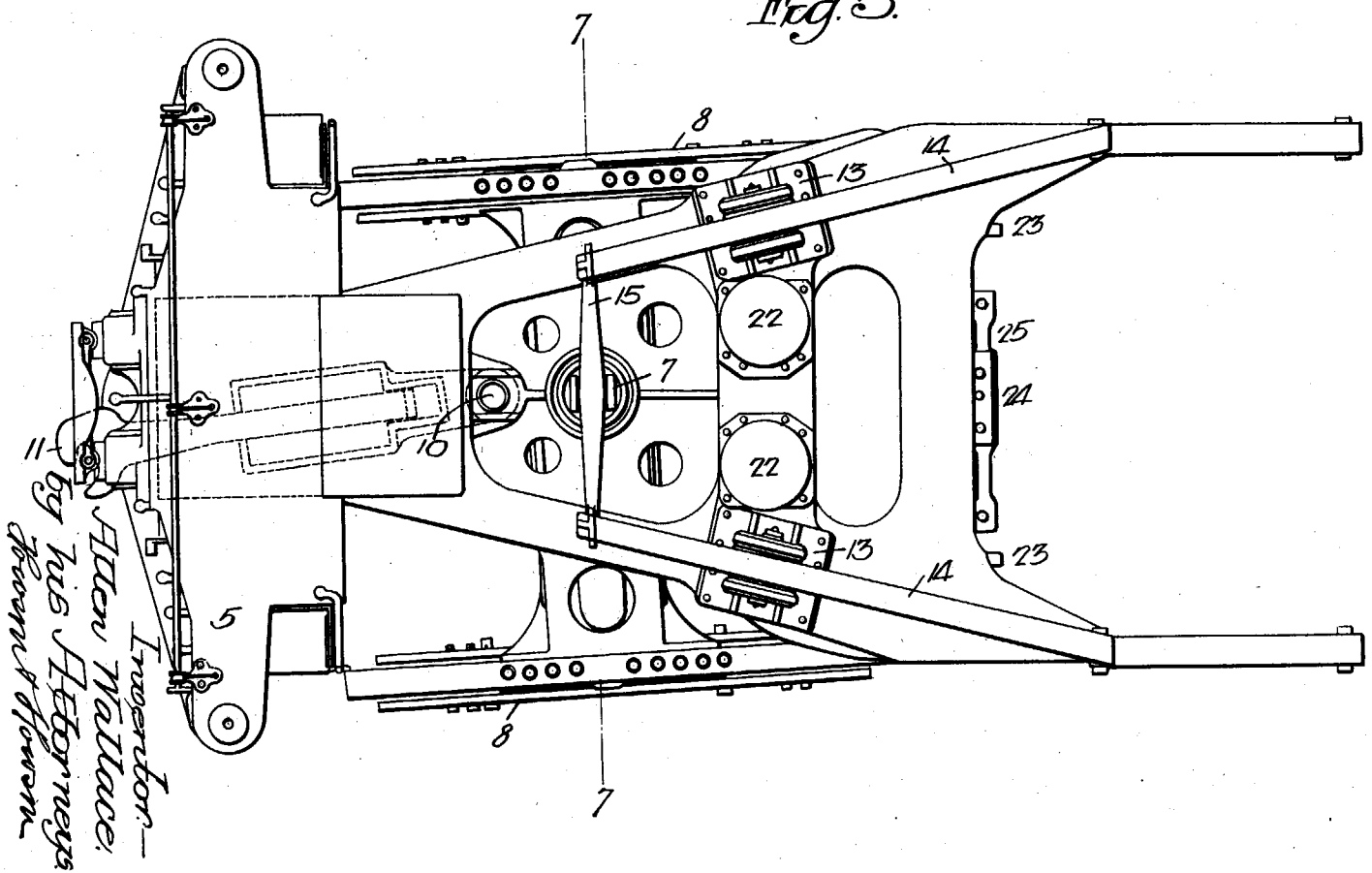

A. WALLACE.

FOOTPLATE FOR ELECTRIC LOCOMOTIVES.

APPLICATION FILED JAN. 31, 1921.

Reissued July 5, 1921. 15,145.

4 SHEETS—SHEET 4.

Inventor
Allen Wallace.
by his Attorneys—
Howson & Howson.

UNITED STATES PATENT OFFICE.

ALLEN WALLACE, OF MOORESTOWN, NEW JERSEY, ASSIGNOR TO BALDWIN LOCOMOTIVE WORKS, OF PHILADELPHIA, PENNSYLVANIA, A CORPORATION OF PENNSYLVANIA.

FOOTPLATE FOR ELECTRIC LOCOMOTIVES.

15,145. Specification of Reissued Letters Patent. Reissued July 5, 1921.

Original No. 1,343,698, dated June 15, 1920, Serial No. 278,252, filed February 20, 1919. Application for reissue filed January 31, 1921. Serial No. 441,440.

*To all whom it may concern:*

Be it known that I, ALLEN WALLACE, a citizen of the United States, residing at Moorestown, in the county of Burlington and State of New Jersey, have invented certain new and useful Improvements in Footplates for Electric Locomotives, of which the following is a specification.

The object of my invention is to improve the construction of the frame of an electric locomotive by providing a foot plate at each end of the main frame of the locomotive, formed in such a manner as to provide bearings and supports for a number of the moving parts of the locomotive structure and also the bearing for the trucks at the ends of the frame.

In the accompanying drawings:—

Fig. 2, is an enlarged plan view of one of the foot plates;

Fig. 3, is a side view of the same;

Fig. 5, is a plan view of the locomotive frame, showing the foot plate and certain parts of the locomotive mounted thereon;

Figure 1:
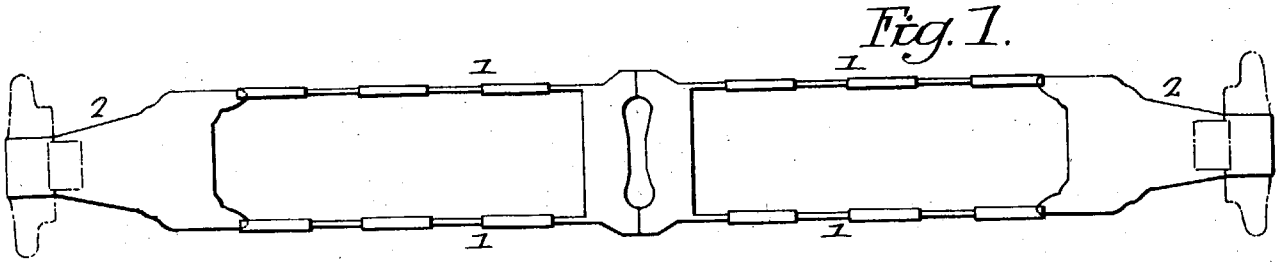
Figure 1, is a diagrammatic plan view of a locomotive frame, showing a foot plate at each end thereof.

Referring to Fig. 1, 1, 1 are the side members of the frame of a locomotive. 2, 2 are the foot plates, one located at each end of the frame structure and securely fastened to the side members. The two foot plates are identical so that it will only be necessary to describe one in detail.

In electric locomotive practice at the present time, the two ends of the locotive are usually similar in construction and the several parts of the locomotive are duplicated, such as the end trucks, the bumper, couplings, &c.

Figure 8:
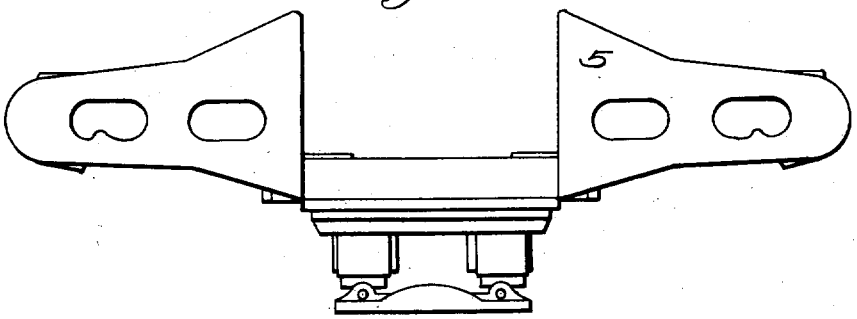
Fig. 8, is a detached plan view of the bumper.
Figure 9:
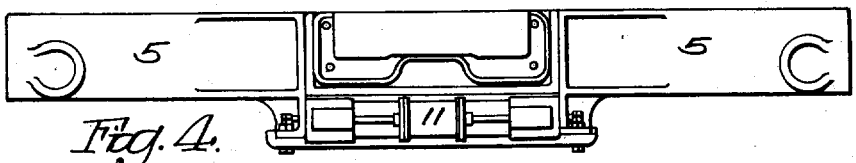
Fig. 9, is an end view of the same.
Figure 4:
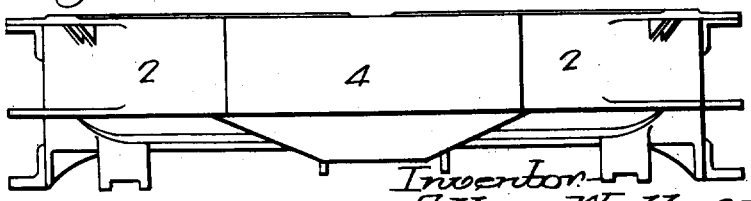
Fig. 4, is an end view looking in the direction of the arrow 1, Fig. 2.

Referring to Figs. 2, 3 and 4, each foot plate has a flanged extension 3 at each side which is bolted, or riveted, to the side members 1 of the locomotive frame. At the opposite end is a portion 4 shaped to receive the bumper structure 5, Fig. 8. In some instances, the bumper structure may be made integral with the foot plate, but I prefer to make it separate so as to avoid intricate castings.

Figure 6:
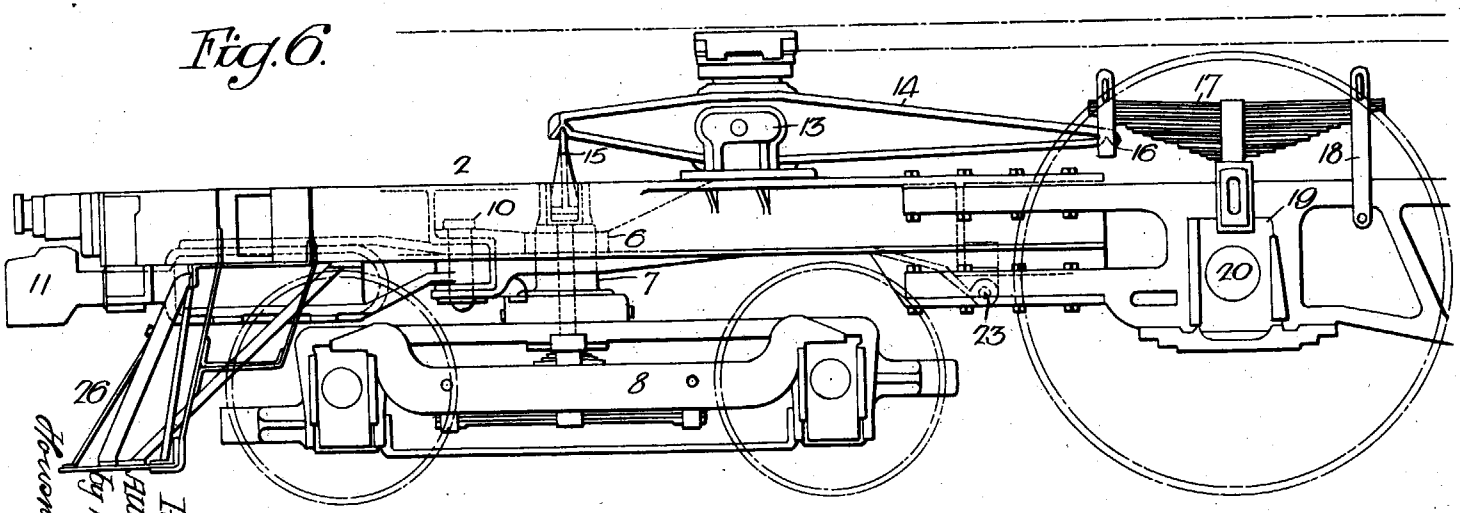
Fig. 6, is a side view of the construction shown in Fig. 5.
Figure 7:
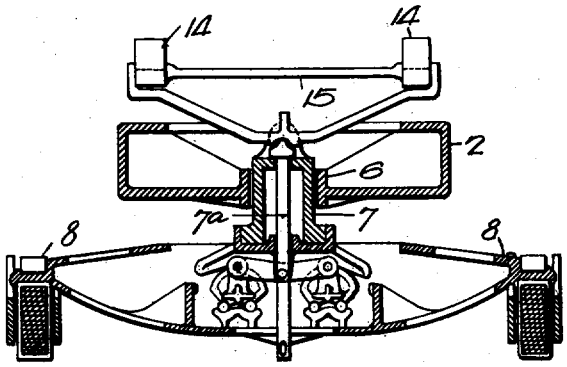
Fig. 7, is a transverse sectional view on the line 7—7, Fig. 5.

At the center of the foot plate is the bearing 6 for the center pin 7 of an end truck 8, Figs. 5 and 6, which is an ordinary four wheeled truck in the present instance. Directly in front of this bearing 6 is a bearing 9 for the pivot pin 10 of the draw bar of the coupling 11, which may be of any type desired. The foot plate is surfaced at 12 at each side of the center back of the bearing 6 for the fulcrum castings 13 on which are hung the equalizing beams 14, which are arranged at an angle in respect to the longitudinal line of the locomotive and are connected to a beam 15 at one end, which is supported on a pin $7^a$ within the pivot 7 of the truck 8, while the other end of each beam 14 is connected by a link 16 to one end of a spring 17. The opposite end of the spring is connected by a link 18 to the frame 1, while the spring rests on the box 19 in which the axle 20 of one of the driving wheels is mounted.

On a line with the surfaced portions 12 for the fulcrum castings of the equalizing beams 14 are surfaces 21 to which are secured the cab spring supports 22, Fig. 5. At one end of the foot plate are lugs 23 from which the brake hangers are suspended, and at the center at the same end as the lugs is a support 24 to which the bar 25 is secured which supports the driving motor or motor suspension. The adjustable pilot 26 is also supported by the foot plate.

Each foot plate is an integral steel casting and may be surfaced at any point desired to receive any parts of the locomotive, and can be bored or drilled at different points for the reception of the other elements than those shown.

I claim:

1. A foot plate for an electric locomotive frame arranged to be attached to either end of the main frame of a locomotive and having a single extension at the opposite end to which the bumper frame is secured and having a center bearing for a pivoted truck and having an opening at the center bearing for the passage of the center pin of the truck and having a pivot bearing for the draw bar of a coupling.

2. A foot plate for an electric locomotive frame arranged to be attached to either end of the main frame of the locomotive; having two extensions at one end arranged to be secured to the main frame of the locomotive and a single extension at the opposite end to which the bumper frame is secured; also having a center bearing for the truck, a pivot bearing for the draw bar of a coupling; and having surfaces on each side on which the fulcrum castings carrying the equalizing levers are mounted.

3. A foot plate for an electric locomotive made in a single casting of full width at one side and having extensions arranged to be secured to the main frame of a locomotive and tapered toward the opposite end, and having a reduced portion adapted to receive the bumper bar of the locomotive; a bearing for the pivot of a truck; a bearing for the draw bar of a coupling; and having lugs at the opposite end to which the brake hangers may be attached; and having supports for the motor, all cast integral with the said foot plate.

4. A foot plate for an electric locomotive made in a single casting and tapered from one end to the other, the wide end of said plate having extensions adapted to be secured to the main frames of the locomotive, the opposite end having a reduced projection to which the bumper bar of a locomotive can be attached and having, intermediate of the two ends, a center bearing for the center pin of one of the trucks, and also having a bearing for the pivot pin of the draw bar of a coupling, which extends beyond the bumper bar, and having lugs at the opposite end from which the brake hangers are hung, and having at the center of said end a support for a motor, and having, between said support and the truck, pivot bearing surfaces on which the fulcrum castings of the equalizing mechanism are mounted as well as the cab spring supports.

5. In a locomotive frame, the combination of two main side frames with two cast foot plates, one secured at one end of the main frame, and the other secured at the other end, said foot plates being identical in form and each having an end reduced in width; a bumper frame secured to the reduced portion of the foot plate, each foot plate having a pivot bearing; a truck mounted under each foot plate and having a pivot pin extending into the bearings; fulcrum castings secured to each foot plate; an equalizing lever pivotally mounted on each fulcrum casting; and a cross bar carried by the pivot pin of the truck and connected to one end of each equalizing lever.

6. In a locomotive frame, the combination of two main frames with two cast foot plates, one secured at one end of the main frame and the other secured at the other end, said foot plates being identical in form and each having an end reduced in width; a bumper frame secured to the reduced portion of the foot plate, each foot plate having a pivot bearing; a truck mounted under each foot plate and having a pivot pin extending into the bearings; fulcrum castings secured to each foot plate; an equalizing lever pivotally mounted on each fulcrum casting; a cross bar carried by the pivot pin of the truck and connected to one end of each equalizing lever; and cab spring supports on each of the foot plates at either side of the center and substantially in a line with the pedestals of the equalizing gear.

7. As a new article of manufacture, a locomotive front end frame formed in a single piece and comprising a pair of side members which gradually converge toward their forward ends.

8. A locomotive front end frame comprising a pair of integrally connected side members which gradually converge toward their forward ends, and a pilot or buffer beam support at the forward end of said front end frame.

9. A locomotive front end frame comprising a pair of integrally connected side members which gradually converge toward their forward ends, a transversely disposed member integral with the forward portions of said side members, and there being a draw bar pocket formed in said transverse member.

10. A locomotive front end frame comprising a pair of integrally connected side members which gradually converge toward their forward ends, and said frame being provided with a pony truck center guide.

11. A locomotive front end frame comprising a pair of integrally connected side members which gradually converge toward their forward ends, and equalizer side bearing pads on said side members.

12. A locomotive end frame comprising a pair of integrally connected side members, and a motor support formed integral with said frame.

13. A locomotive front end frame comprising a pair of integrally connected side members, and brake hanger lugs formed integral with said frame.

14. A locomotive front end frame comprising a pair of integrally connected side members, a transversely disposed member connecting the rear portions of said side members, a motor support on said transverse member, and brake hanger lugs on said transverse member.

15. A locomotive front end frame comprising a pair of integrally connected side members, a motor support integral with said frame, equalizer side bearing pads on said frame, a pony truck center guide formed near the center of the frame, and a buffer or pilot beam support at the forward end of said frame.

16. A locomotive front end frame comprising a pair of side members, a transversely disposed front end member formed integral with said side members, said front end member constituting a support and point of attachment for a buffer or pilot beam, transversely disposed members formed integral with the side members to the rear of said front end member, and equalizer side bearing pads formed on top of one of said transversely disposed members.

17. A locomotive front end frame comprising a pair of side members which gradually converge toward their forward ends, a transversely disposed front end member formed integral with said side members, said front end member constituting a support and point of attachment for a buffer or pilot beam, transversely disposed members formed integral with the side members to the rear of said front end member, and a draw bar pocket formed in one of said transversely disposed members.

18. A locomotive front end frame comprising a pair of side members which gradually converge toward their forward ends, a transversely disposed front end member formed integral with said side members, said front end member constituting a support and point of attachment for a buffer or pilot beam, transversely disposed members formed integral with the side members to the rear of said front end member, and a pony truck center guide on one of said transversely disposed members.

19. A locomotive front end frame comprising a pair of side members, a transversely disposed front end member formed integral with said side members, said front end member constituting a support and point of attachment for a buffer or pilot beam, transversely disposed members formed integral with the side members to the rear of said front end member, and a motor support formed on one of said transversely disposed members.

20. A locomotive front end frame comprising a pair of side members, a transversely disposed front end member formed integral with said side members, said front end member constituting a support and point of attachment for a buffer or pilot beam, transversely disposed members formed integral with the side members to the rear of said front end member, and brake hanger lugs formed on one of said transversely disposed members.

21. A locomotive front end frame comprising a pair of integrally connected side members which gradually converge toward their forward ends, and bearings on the rear portions of said members, which bearings serve as supports and points of attachment for parts of the main frame of the locomotive.

22. A locomotive front end frame comprising a pair of integrally connected side members, the front and rear end portions of which side members are substantially parallel with each other and the intermediate portions of said side members occupy angular positions and converging toward the parallel front end portions.

ALLEN WALLACE.